US010133308B2

(12) United States Patent
Fernandes et al.

(10) Patent No.: US 10,133,308 B2
(45) Date of Patent: Nov. 20, 2018

(54) METHOD AND SYSTEM FOR SMART MEDIA HUB

(71) Applicant: I-BLADES, INC., Milpitas, CA (US)

(72) Inventors: Jorge Fernandes, Danville, CA (US); Jerry Panagrossi, San Carlos, CA (US)

(73) Assignee: I-BLADES, INC., Milpitas, CA (US)

( * ) Notice: Subject to any disclaimer, the term of this patent is extended or adjusted under 35 U.S.C. 154(b) by 0 days.

(21) Appl. No.: 15/584,344

(22) Filed: May 2, 2017

(65) Prior Publication Data

US 2018/0107247 A1    Apr. 19, 2018

Related U.S. Application Data

(60) Provisional application No. 62/330,656, filed on May 2, 2016, provisional application No. 62/350,593, filed on Jun. 15, 2016.

(51) Int. Cl.
*G06F 1/16* (2006.01)
*H02G 11/02* (2006.01)
*H01F 7/16* (2006.01)

(52) U.S. Cl.
CPC .......... *G06F 1/1632* (2013.01); *G06F 1/1656* (2013.01); *H01F 7/16* (2013.01); *H02G 11/02* (2013.01)

(58) Field of Classification Search
CPC combination set(s) only.
See application file for complete search history.

(56) References Cited

U.S. PATENT DOCUMENTS

| 6,273,735 | B1 | 8/2001 | Johnson et al. |
| 9,407,048 | B2 * | 8/2016 | George ................ H01R 13/72 |
| 9,472,909 | B2 * | 10/2016 | Ginsberg .............. H01R 13/72 |
| 9,544,005 | B2 * | 1/2017 | Wei ...................... H04B 1/3883 |
| 9,654,606 | B1 * | 5/2017 | Warren ................. H02G 11/02 |
| 9,673,852 | B1 * | 6/2017 | Crossley ............. H04B 1/3888 |
| 9,686,456 | B2 * | 6/2017 | Wu ....................... H04N 5/2253 |
| 9,762,013 | B2 * | 9/2017 | George ................ H01R 35/025 |
| 2014/0253038 | A1 | 9/2014 | Posa et al. |
| 2015/0156297 | A1 | 6/2015 | Crawford et al. |
| 2015/0179050 | A1 | 6/2015 | Katingari et al. |
| 2015/0364875 | A1 | 12/2015 | Ginsberg |
| 2016/0099517 | A1 | 4/2016 | Fernandes et al. |

OTHER PUBLICATIONS

PCT/US2017/030573, "Invitation to Pay Add'l Fees and Partial Search Rpt", dated Jun. 27, 2017, 2 pages.

(Continued)

*Primary Examiner* — Lisa Lea Edmonds
(74) *Attorney, Agent, or Firm* — Kilpatrick Townsend & Stockton LLP

(57) ABSTRACT

A module for use with an electronic device includes a housing including a processor and a memory and an electronic cable coupled to a retracting spool disposed in the housing. The electronic cable includes a plurality of retention tabs disposed on the electronic cable. The module also includes a cable retention aperture passing through a side of the housing and including a wide portion and a narrow portion adjacent the wide portion. The plurality of retention tabs contact the narrow portion of the cable retention aperture to prevent retraction of the electronic cable into the housing.

15 Claims, 14 Drawing Sheets

(56) References Cited

OTHER PUBLICATIONS

A Geeky World by Pasha, "Add Memory and Battery to Smartphones Using i-Blades Smartcase", <URL: http://www.ageekyworld.com/add-memory-and-battery-to-smartphones-using-i-blades-smartcase/>, Jan. 12, 2016, 4 pages.

The Verge by James Vincent, "The Nexpaq modular smartphone case will let you add lasers to 13-15 your mobile", <URL: https://www.theverge.com/2015/4/29/8507171/nexpaq-modular-smartphone-case-kickstarter>, Apr. 29, 2015, 11 pages.

PCT/US2017/030573, "International Search Report and Written Opinion" dated Sep. 13, 2017, 13 pages.

* cited by examiner

METHOD AND SYSTEM FOR SMART MEDIA HUB

CROSS-REFERENCES TO RELATED APPLICATIONS

This application claims priority to U.S. Provisional Patent Application Nos. 62/330,656, filed on May 2, 2016, entitled "Method and System for Smart Media Hub," and 62/350,593, filed on Jun. 15, 2016, entitled "Devices for Viewing Virtual Reality Content," the disclosures of which are hereby incorporated by reference in their entirety for all purposes.

BACKGROUND OF THE INVENTION

Portable electronic devices have experienced widespread use during recent times. Cabling to connect portable electronic devices, distribution of content to portable electronic devices, and security protocols related to portable electronic devices have been developed.

Despite the progress made in the field of portable electronic devices, there is a need in the art for improved methods and systems related to portable electronic devices.

SUMMARY OF THE INVENTION

Embodiments of the present invention relate to cables for electronic devices. More particularly, embodiments of the present invention provide methods and systems to integrate cables into modules operable to interact with mobile electronic devices.

Embodiments of the present invention reduce the need to carry an extra electronic cable for each mobile device or accessory that a person utilizes. The modules described herein are operable with a variety of mobile electronic devices that have a variety of different electronic cables compatible with varying formats.

Embodiments of the present invention also relate to portable smart media devices and smart media hubs. More particularly, embodiments of the present invention provide methods and systems for storing a plurality of portable smart media devices with digital content stored thereon for personal entertainment in a smart media hub. A user may rent a portable smart media device from the smart media hub and connect the portable smart media device to a mobile device directly using features provided on the portable smart media device or using a connection cable. The connection cable may be obtained, for example, as described in other aspects of the present invention.

Embodiments of the present invention offer a convenient way to obtain digital entertainment content and play the digital entertainment content on a mobile device, such as a cellular phone. A user may rent a portable smart media device with digital content stored thereon from one smart media hub and return it to another smart media hub at convenient locations without interacting with a service person. The portable smart media device can be easily connected to the mobile device through a connection with high data transfer speed.

According to an embodiment of the present invention, a smart media hub is provided. The smart media hub includes a controller, a plurality of slots, each slot configured to accommodate a portable smart media device, and a plurality of locking devices coupled to the controller. Each locking device is associated with a slot of the plurality of slots. Each locking device of the plurality of locking devices is configured to lock or release the portable smart media device under a control of the controller.

As described herein, methods and systems are provided for storing a plurality of portable smart media devices with digital content stored thereon in a smart media hub for rent or purchase by a user. The smart media hub can include a controller and a plurality of slots configure to accommodate portable smart media devices. Each slot can have an associated locking device coupled to the controller for locking or releasing the portable smart media device under the control of the controller.

According to another embodiment of the present invention, a module for use with an electronic device is provided. The module includes a housing including a processor and a memory and an electronic cable coupled to a retracting spool disposed in the housing. The electronic cable comprises a plurality of retention tabs disposed on the electronic cable. The module also includes a cable retention aperture passing through a side of the housing and including a wide portion and a narrow portion adjacent the wide portion. The plurality of retention tabs contact the narrow portion of the cable retention aperture to prevent retraction of the electronic cable into the housing.

According to a specific embodiment of the present invention, a smart media system is provided. The smart media system includes one or more portable smart media devices. Each of the one or more portable smart media devices includes a housing including a processor and a memory, an electronic cable coupled to a retracting spool disposed in the housing, and a cable retention aperture passing through a side of the housing and including a wide portion and a narrow portion adjacent the wide portion. The electronic cable comprises a plurality of retention tabs disposed on the electronic cable. The plurality of retention tabs contact the narrow portion of the cable retention aperture to prevent retraction of the electronic cable into the housing.

The smart media system also includes a smart media hub comprising a controller, a plurality of slots, each slot configured to accommodate one or the one or more portable smart media devices, and a plurality of locking devices coupled to the controller. Each locking device is associated with a slot of the plurality of slots. Additionally, each locking device of the plurality of locking devices is configured to lock or release the portable smart media device under a control of the controller.

According to a particular embodiment of the present invention, an electronic cable is provided. The electronic cable includes a center portion and a first connector disposed at a first end of the center portion and having a first male extension. The electronic cable also includes a second connector having a female connector configured to connect to the male extension of the first connector. The second connector comprises a second male extension different from the male extension. The electronic cable further includes a third connector disposed at a second end of the center portion and having a third male extension and a fourth connector having a second female connector configured to connect to the third male extension of the third connector. The fourth connector can include a fourth male extension different from the third male extension. The electronic cable can also include a fifth connector comprising a fifth male extension different from the third male extension and the fourth male extension. As an example, the third male extension can comply with the micro-USB standard, the fourth male extension can comply with the Thunderbolt standard, and the fifth male extension can comply with the USB-C standard. In some embodiments, the electronic cable further includes a first tie connecting the second connector to the center portion and a second tie connecting the fourth connector to the center portion.

According to another particular embodiment of the present invention, a virtual reality viewer blade is provided. The virtual reality viewer blade includes a first panel operable to be joined to a smart case. The first panel includes a graphics processor unit. The virtual reality viewer blade also includes a second panel connected to the first panel and a third panel connected to the second panel and including a nose piece and a set of optical apertures. The virtual reality viewer blade further includes a fourth panel connected to the third panel and a set of sub panels connected to the fourth panel. In a folded configuration, the first through fourth panels are adjacent each other and parallel. In a virtual reality viewer configuration, the second panel extends away from the first panel in a direction perpendicular to the first panel, the third panel lies in a plane parallel to the first panel, the fourth panel lies in a plane normal to the first panel, and the set of sub panels form opposing sides a box defined by the second panel, the third panel, and the fourth panel.

Numerous benefits are achieved by way of the present invention over conventional techniques. For example, embodiments of the present invention provide portable modules that are interoperable with a variety of mobile devices. These and other embodiments of the invention along with many of its advantages and features are described in more detail in conjunction with the text below and attached figures.

DETAILED DESCRIPTION OF SPECIFIC EMBODIMENTS

Figure 1A:
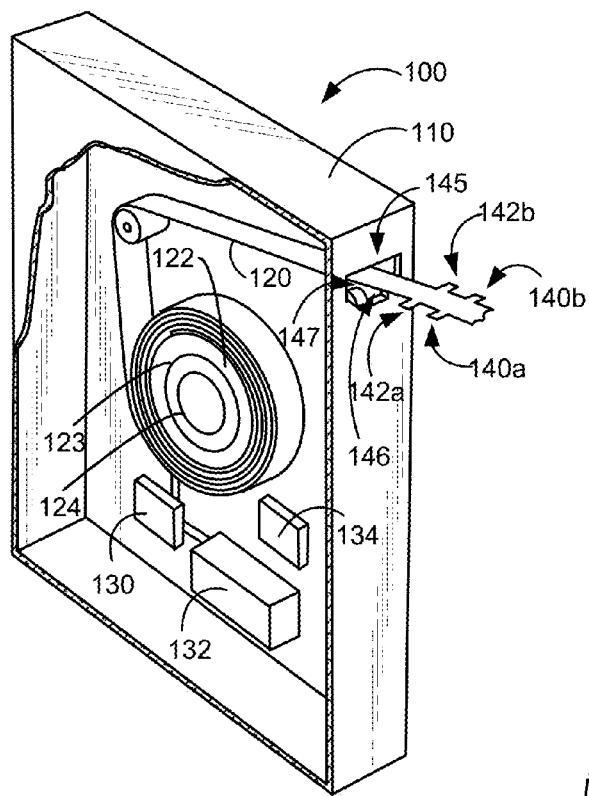
FIG. 1A is a simplified perspective view of a module for use with a mobile electronic device according to an embodiment of the present invention.

FIG. 1A is simplified perspective view of a module for use with a mobile electronic device according to an embodiment of the present invention. The module 100 includes a housing 110 that encloses an electronic cable 120, a spool 122 for the electronic cable, a memory 130, a power source 132, for example, a battery, and a processor 134. A portion of the cable and the end of the cable is not shown for clarity, but can be any suitable electronic connector, including USB, micro-USB, Firewire, Thunderbolt, Lightning, or the like.

Figure 1C:
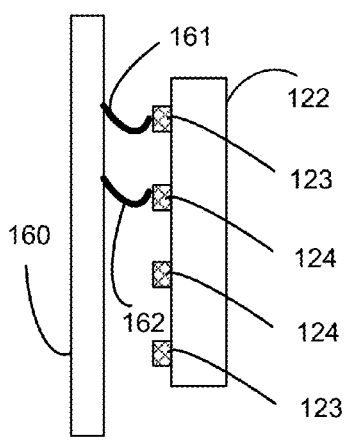
FIG. 1C is a simplified side view of a spinning wheel contact system according to an embodiment of the present invention.

The cable connection at the spool end, that is, the connection from the electronic cable 120 tied to the spool 122 to a printed circuit board mounted in the housing 110, can utilize a spinning contact wheel design. FIG. 1C is a simplified side view of a spinning wheel contact system according to an embodiment of the present invention. As shown in FIG. 1C, the spool 122 includes a set of annular contacts 123 and 124 on one side of the spinning spool. In this view, the spool rotates in a plane perpendicular to the plane of the figure. The annular contacts 123 and 124 connect to a printed circuit board 160 positioned to the left of the spool in the housing. The electrical connection between the printed circuit board 160 and the annular contacts 123 and 124 is through two electrical contacts 161 and 162 or other suitable contact structures that project toward the spool. As illustrated in FIG. 1C, each electrical contact making contact with one of the annular contacts, i.e., electrical contact 161 to annular contact 123 and electrical contact 162 to annular contact 124. In some embodiments, multiple electrical contacts can be utilized to make electrical contact with the annular contacts. In some embodiments, pogo pin structures, finger structures, or the like can be utilized as the electrical contacts. In other embodiments, the electrical contacts can be mounted on the spool and reach toward the left to make contact with annular contacts formed on the printed circuit board. In other embodiments, the electronic cable can include a module end that is fixed to a printed circuit board disposed in the housing. The electrical connections between the wires included in the electronic cable 120 and the spool 122 are not illustrated for the sake of clarity. One of ordinary skill in the art would recognize many variations, modifications, and alternatives.

In some embodiments, audio, images, videos, and the like stored on the memory are accessed using the processor and provided to a mobile electronic device (not shown) for playing and/or viewing on the electronic device. Additional description related to the use of the module, which may also be referred to as an electronic blade or blade, is provided in U.S. patent application Ser. No. 14/876,510, filed on Oct. 6, 2015, the disclosure of which is hereby incorporated by reference in its entirety for all purposes. Embodiments of the present invention extend the functionality of electronic blades by providing a multipurpose electronic cable that is integrated into the module can be used to connect mobile devices compatible with different cable formats to the module.

The spool 122 includes a tension mechanism to retract the electronic cable when not in use so that the electronic cable can be placed in a storage position. When the cable is extended as illustrated in FIG. 1A, for example, extended to near the full extension length of the cable, a set of opposing retention tabs 140a/140b and 142a/142b are utilized in conjunction with cable retention aperture 145 to retain the cable in the extended position. Referring to FIG. 1A, the cable retention aperture 145, which can be formed in the side of the module 100, includes a wide portion 147 and a narrow portion 146. The electronic cable 120 is free to pass through the cable retention aperture when the cable is disposed in the wide portion 147. Once the cable is extended to a desired length, the cable can be disposed in the narrow portion 146. The retention tabs 140a/140b and/or 142a/142b are then able to fix the position of the cable.

Figure 1B:
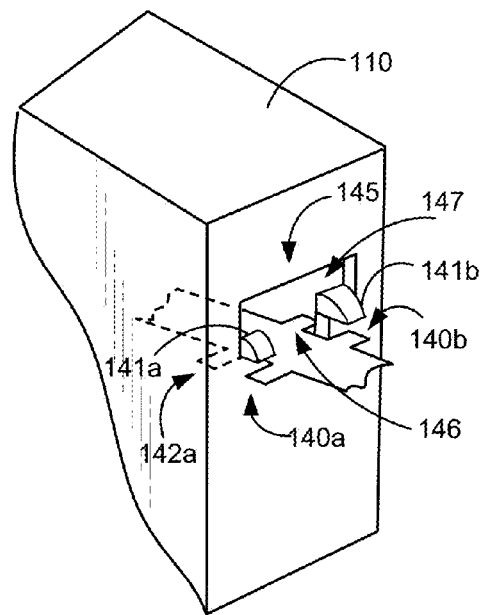
FIG. 1B is a simplified perspective view of a cable retention element of the housing illustrated in FIG. 1A.

FIG. 1B is a simplified perspective view of the cable retention aperture illustrated in FIG. 1A. The cable retention aperture 145 is positioned in a side of the housing 110. As illustrated in FIG. 1B, the cable is disposed in the narrow portion 146 such that the retention tabs 140a/140b are disposed on the outside of the housing and the retention tabs 142a/142b are disposed on the inside of the housing. During extension and retraction of the cable, the cable is able to pass through the cable retention aperture because the wide portion 147 is wider than the combined width of the retention tabs. The cable is fixed when disposed in the narrow portion 146 because the combined width of the retention tabs is greater than the width of the opening in the narrow portion.

In order to provide for retention in the vertical direction, a set of retention shelves including retention shelf 141a and retention shelf 141b are positioned at the portions of the cable retention aperture at which the narrow portion and the wide portion meet. The retention shelves 141a and 141b extend away from the side of the housing and serve to arrest the motion of the electronic cable in the vertical direction when the cable is in the fixed position. As illustrated in FIG. 1B, when the cable is in the fixed position, the retention tabs 140a/140b are positioned below the retention shelves to prevent them moving up, against the side of the housing to prevent the cable from retracting, and the central portion of the cable is positioned against the bottom of the cable retention aperture to prevent the cable from moving down. Thus, the cable is securely retained when positioned in the extended position. In order to retract the cable, the user pulls the cable out of the housing, lifts the retention tabs over the retention shelves, and allows the cable to retract through the wide portion of the cable retention aperture. In the embodiment illustrated in FIG. 1A, the top surfaces of the retention shelves 141a and 141b are sloped to enable the retention tabs to be slide down over the retention shelves into the fixed or locked position. Thus, the sloped shape can be used to guide the cable to the locked position. In other embodiments, a shelf without a sloped top surface is utilized. One of ordinary skill in the art would recognize many variations, modifications, and alternatives.

Although the cable illustrated in FIGS. 1A and 1B includes a single set of adjacent retention tab pairs, this is not required by the present invention. In some embodiments, a series of opposing retention tab pairs are provided along the length of the cable. The retention tab pairs can be distributed uniformly along the cable, at predetermined increments, for example, every 5 inches, at several selected positions along the length of the cable, distributed non-uniformly along the cable, only at a position near the full extension length of the cable, or the like. In other embodiments, the retention tabs are only provided on one side of the cable or the retention tabs are provided on opposite sides of the cable, but not with the retention tabs necessarily opposing each other. The ability to hold the cable in an extended position using the cable retention tabs and the cable retention aperture, for example, fully or partially extended, enables a module design that is simplified in comparison with conventional techniques. The simplicity of the spool mechanism enables the manufacturing of a thin module suitable for mobile applications. Additionally, the reliability of the design adds significant value for mobile applications in which repeated uses are common.

An exemplary use case for embodiments of the present invention is rental during a flight. The module, which can include a set of movies, for example, 50 movies, can be rented at the beginning of the flight. A mobile device such as a smart phone, a tablet, a laptop computer, or the like, could be connected to the module using the provided cable. The processor interacts with the mobile device to stream one or more movies during the flight utilizing the connection through the cable. In addition to providing the media content, the module can provide power to the mobile device utilizing the included power supply, for example, a high capacity battery, for instance rated at 3,000 mAh. The format of the movie can be customized depending on the characteristics of the mobile device.

Although a substantially flat cable is illustrated in FIGS. 1A and 1B, the present invention is not limited to flat cables and other cable geometries can be utilized according to an embodiment of the present invention. In addition to the illustrated electronic cable, other media output elements could be incorporated into the module, including a set of headphones, with the headphones spooled around a spool and incorporating retention tabs in a manner similar to the cable retention tabs and operable to engage with the cable retention aperture or a separate headphones retention aperture. In some embodiments, the end of the cable includes a portion of the multipurpose electronic cable discussed in relation to FIG. 2.

Figure 2:
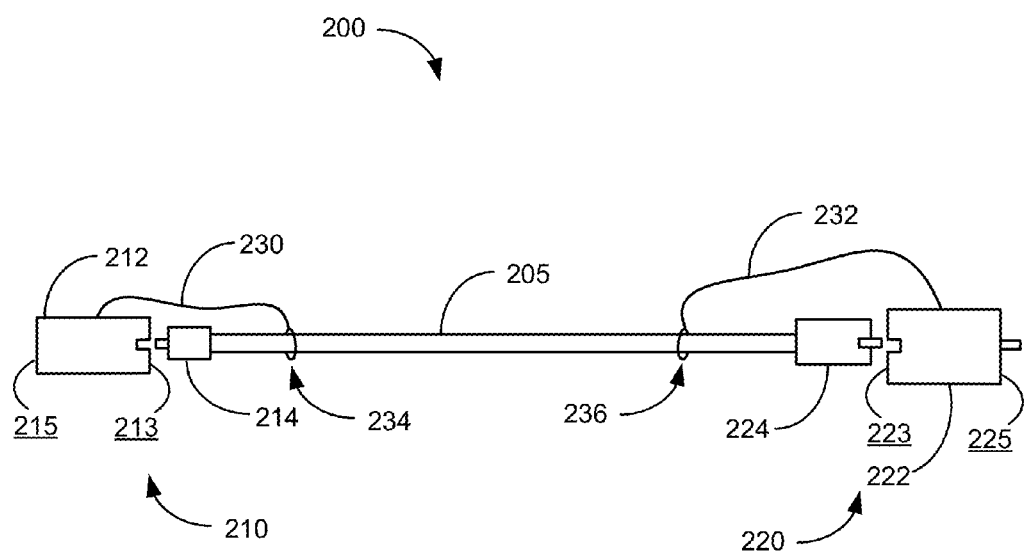
FIG. 2 is a simplified schematic diagram of a multipurpose electronic cable according to an embodiment of the present invention.

FIG. 2 is a simplified schematic diagram of a multipurpose electronic cable according to an embodiment of the present invention. The multipurpose electronic cable 200 includes a first end 210 and a second end 220. The first end is typically operable to be plugged into a power supply and the second end is typically operable to be plugged into a mobile device. The multipurpose electronic cable has a center portion 205 of a predetermined length, for example, one foot, three feet, or the like.

Utilizing the multipurpose electronic cable, which can be referred to as a universal cable, electronic blades can be utilized with mobile devices that do not have smart cases operable to couple to the electronic blade. The electronic blade, in this implementation, would have a connector that is operable to connect to the multipurpose electronic cable, which can then be connected to a mobile device without a smart case attached to the mobile device. Examples of the smart case can be found in, for example, U.S. application Ser. No. 14/017,040, filed on Sep. 3, 2013, now U.S. Pat. No. 8,798,675, the disclosure of which is hereby incorporated by reference in its entirety for all purposes Alternatively, as described in relation to FIG. 3, the module and/or electronic blade can incorporate an electronic cable incorporating elements of the multipurpose electronic cable to provide for universality. In some embodiments, the connector on the electronic blade can be used to charge the electronic blade using the multipurpose electronic cable. If several electronic blades are stacked together, the group can be charged using the multipurpose electronic cable. In some implementations, the electronic blade can be sold in conjunction with a multipurpose electronic cable to enable users without a smart case to utilize the electronic blade with their mobile device. One of ordinary skill in the art would recognize many variations, modifications, and alternatives.

The first end 210 of the multipurpose electronic cable includes a proximal connector 214 and a distal connector 212. The connection at the end of the proximal connector 214 mates with the connection at the first end 213 of the distal connector 212. In the illustrated embodiment, the end of the proximal connector is male and the first end 213 of the distal connector 212 is female, facilitating mating of the two components. The distal connector 212 can thus be detached as illustrated when the user desires to utilize the proximal connector 214 to connect the cable to an external device such as a power charger. The second end 215 of the distal connector 212 can be a USB connector that can connect to a USB port of a charger, or the like. In order to maintain the distal connector 212 in the vicinity of the multipurpose electronic cable, a tie 230 is fixed to the distal connector 212 and a ring 234 that surrounds the center portion 205. When disconnected, the distal connector is thus only free to move a limited distance and not be lost or otherwise separated from the cable.

The proximal connector 214 includes a connector that is different from that at the second end 215 of the distal connector 212, enabling the multipurpose electronic cable to be utilized with a variety of different devices.

The second end 220 of the multipurpose electronic cable includes a proximal connector 224 and a distal connector 222. The connection at the end of the proximal connector 224 mates with the connection at the first end 223 of the distal connector 222. In the illustrated embodiment, the end of the proximal connector is male and the first end 223 of the distal connector 222 is female, facilitating mating of the two components. The distal connector 222 can thus be detached as illustrated when the user desires to utilize the proximal connector 224 to connect the cable to an external device such as a mobile device. The second end 225 of the distal connector 222 can be a USB connector that can connect to a USB port of a mobile device, a micro-USB connector that can connect to a micro-USB port of a mobile device, a Thunderbolt connector that can connect to a Thunderbolt port of an iPhone, a Lightning connector that can connect to a Lightning port of an iPhone, a USB-C connector, or the like. In order to maintain the distal connector 222 in the vicinity of the multipurpose electronic cable, a tie 232 is fixed to the distal connector 222 and a ring 236 that surrounds the center portion 205. When disconnected, the distal connector is thus only free to move a limited distance and not be lost or otherwise separated from the cable.

The proximal connector 224 includes a connector that is different from that at the second end 225 of the distal connector 222, enabling the multipurpose electronic cable to be utilized with a variety of different devices.

By connecting and/or disconnecting the distal connectors, the multipurpose electronic cable is able to be configured in multiple ways:

Distal connector 212 and distal connector 222
Distal connector 212 and proximal connector 224
Proximal connector 214 and distal connector 222
Proximal connector 214 and proximal connector 224

Although the multipurpose electronic cable illustrated in FIG. 2 includes two connectors on each end, the present invention is not limited to this implementation. In other embodiments, three or more connectors can be utilized to provide additional functionality in accordance with different connectors. As an example, three connectors could be provided: a micro-USB connector, a Thunderbolt connector, and a USB-C connector. Thus, the multipurpose electronic cable illustrated in FIG. 2 is merely exemplary since one or more connectors of different types can be removably attached to each end of the center portion 205. One of ordinary skill in the art would recognize many variations, modifications, and alternatives.

In some alternative embodiments, the rings 234 and/or 236 can be replaced by fixing one end of the ties 230 and 232 to the center portion 205. A variety of attachment mechanisms are within the scope of the present invention, including bonding the end of the tie to the center portion, twisting the end of the tie into receiving structures formed in the center portion so that the tie can be removed as desired, a ring that can be opened, attachment of the end of the tie to a flexible coupler, for example, a spring or nylon cord, or the like. Thus, embodiments of the present invention include implementations in which the end of the ties can be attached in a fixed, detachable, moveable, or flexible manner. In still other embodiments, one or more of ties 230 or 232 are eliminated and distal connectors are not attached to the central portion, but are separate.

Figure 3:
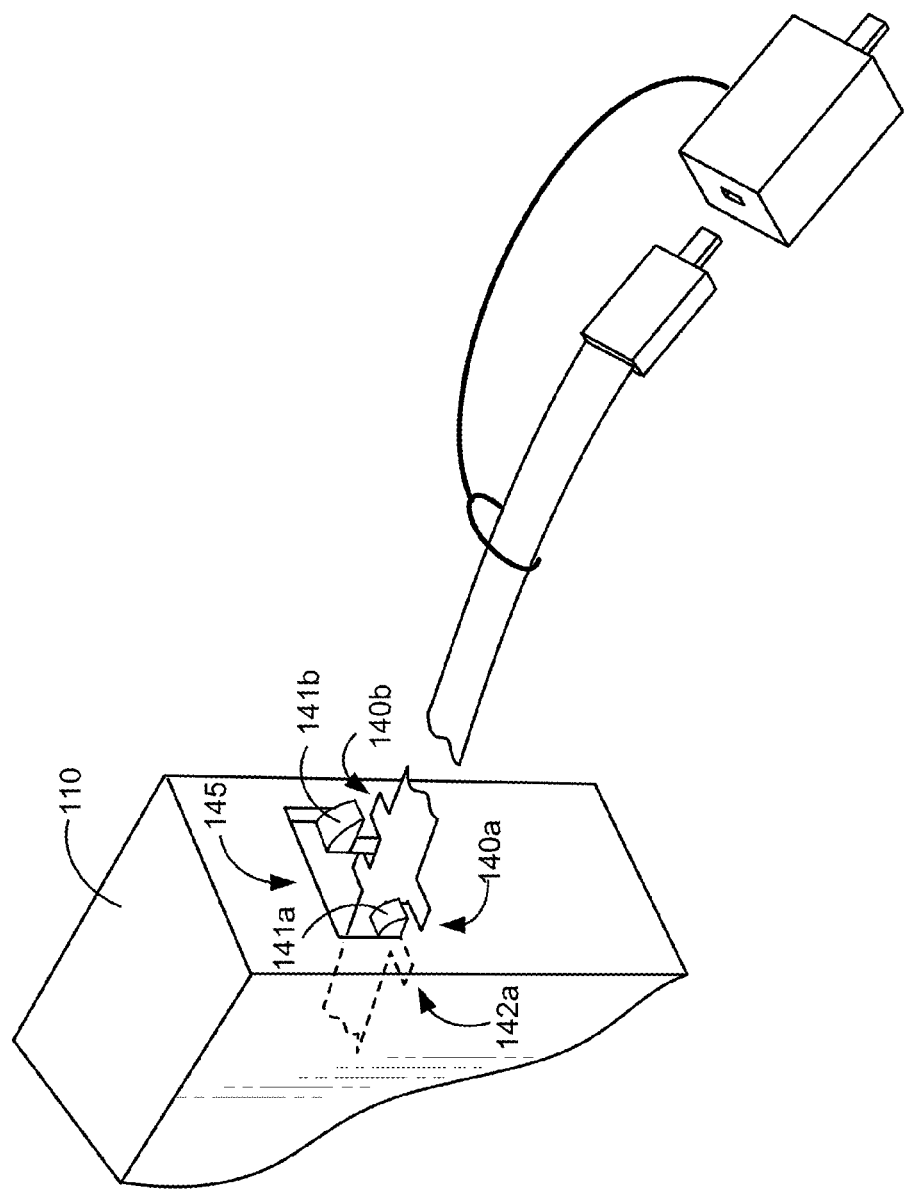
FIG. 3 is a simplified schematic diagram of a portion of a module incorporating a multipurpose electronic connector according to an embodiment of the present invention.

In some embodiments, the cable design illustrated in FIG. 2 is utilized with the module 100 illustrated in FIG. 1. FIG. 3 is a simplified schematic diagram of a portion of a module incorporating a multipurpose electronic connector according to an embodiment of the present invention. As illustrated in FIG. 3, the second end 220 of the multipurpose electronic cable 200 is utilized as the connecting end of cable 120. This design incorporates the cable retention tab design discussed in relation to FIGS. 1A and 1B with the multipurpose connectors discussed in FIG. 2 to provide a module that is operable to connect to a variety of mobile devices. As an example, mobile devices from different manufacturers with different connector formats can be connected with the module, enabling a wide range of functionality. One of ordinary skill in the art would recognize many variations, modifications, and alternatives.

Figure 4:
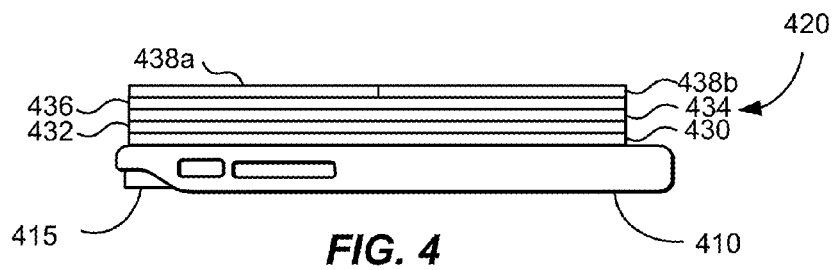
FIG. 4 is a simplified side view of a smart case and an attached virtual reality viewer blade according to an embodiment of the present invention.

FIG. 4 is a simplified side view of a smart case and an attached virtual reality viewer blade according to an embodiment of the present invention. The smart case 410 is operable to receive a mobile device 415 such as a smart phone and provides for electrical connectivity between the smart case and attached blades. Additionally, the smart case includes mechanical attachment points operable to couple with matching mechanical attachments on the blade. In the embodiment illustrated in FIG. 4, the smart case 410 is attached to a virtual reality viewer blade 420 that is shown in the folded configuration. The virtual reality viewer blade can be made of materials that provide sufficient rigidity and are light weight, for example, polycarbonate, plastic, foam, aluminum, carbon fiber, combinations thereof, or the like. The virtual reality viewer blade 420 has substantially the same width and length as the smart case in the embodiment illustrated in FIG. 4 although this is not required by the present invention. In the folded configuration, the thickness of the virtual reality viewer blade is similar to the thickness of the smart case to provide for ease of use, typically in the range of tens of millimeters.

Figure 9A:
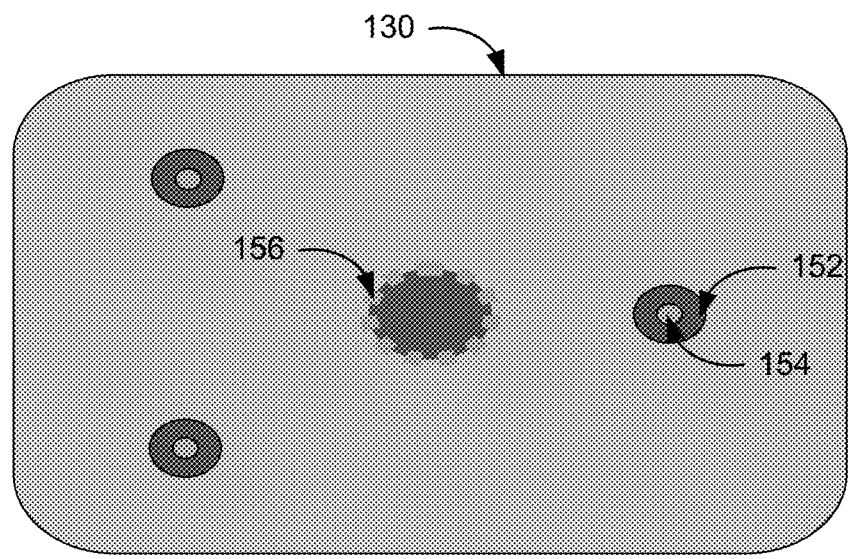
FIG. 9A is a simplified front view of a first panel of a virtual reality viewer blade according to an embodiment of the present invention.

FIG. 9A is a simplified front view of a first panel 430 of virtual reality viewer blade 420 according to an embodiment of the present invention. As shown in FIG. 9A, the front side of first panel 930 of virtual reality viewer blade 420 may include one or more male adapters 452 for attaching to a mobile device or a case for a mobile device. In some embodiments, male adapter 452 may include a load pin 454. Load pin 454 may include a metal. In some embodiments, male adapter 452 may include a magnet and the metal of load pin 454 may be magnetized. Load pin 454 may be of any suitable shape, such as a cylinder, a part of a cylinder, or a bar. The size of load pin 454 may be of any suitable size in length and cross-sectional size. The front side of first panel 430 of virtual reality viewer blade 420 may also include an electrical connector 456 for electrical connection, such as for power and data (e.g., video/audio data) communication.

Figure 9B:
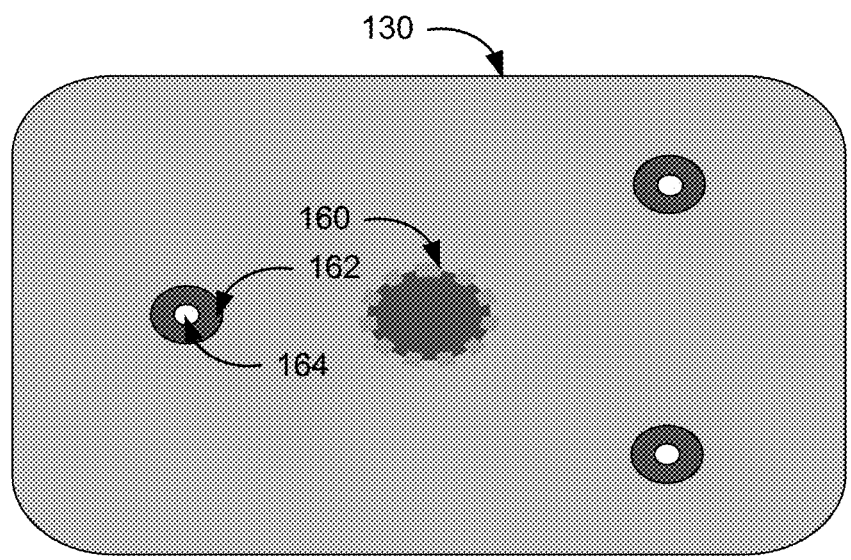
FIG. 9B is a simplified back view of a first panel of a virtual reality viewer blade according to an embodiment of the present invention.

FIG. 9B is a simplified back view of first panel 430 of virtual reality viewer blade 420 according to an embodiment of the present invention. As shown in FIG. 9B, the back side of first panel 430 of virtual reality viewer blade 420 may include one or more female adapters 462 configured to match with male adapters 452. Female adapter 462 may include a magnet having a polarity opposite to the polarity of the magnet on male adapter 452 and a hole 464 that can fit load pin 454. Thus, when put close to each other, female adapter 462 and male adapter 452 may attract each other and load pin 454 may be inserted into hole 464 of female adapter 462. In this way, multiple virtual reality viewer blade 420 may be piggybacked. The back side of first panel 430 of virtual reality viewer blade 420 may also include an electrical connector 460 that can match with electrical connector 456 for electrical connection, such as for power and data (e.g., video/audio data) communication.

Smart case 410 may also include one or more female adapters (not shown) as described above, such that virtual reality viewer blade 420 may be attached to smart case 410 in a similar manner using female adapter(s) on smart case 410 and male adapter(s) 1452 on first panel 430 of virtual reality viewer blade 420. Smart case 410 may also include an electrical connector (not shown) that can match with electrical connector 456 for power and data communication between smart case 410 and first panel 430 of virtual reality viewer blade 420.

Virtual reality viewer blade 420 (e.g., first panel 430) and/or smart case 410 may include one or more buttons or wheels (not shown in FIGS. 9A-9B) in order to provide functionality including, but not limited to, zooming, volume control, directional movement, and menu selection.

Figure 5:
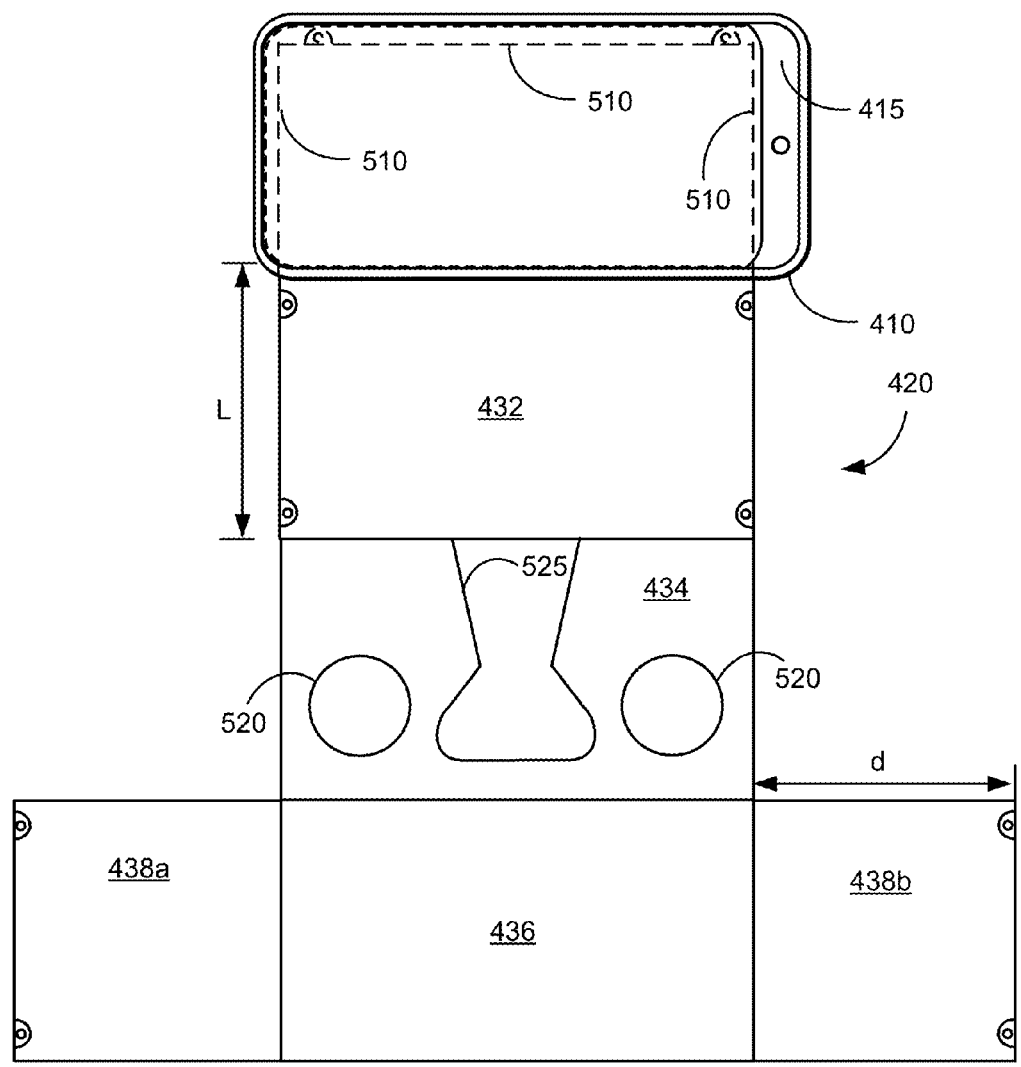
FIG. 5 is a simplified plan view of a smart case and an attached virtual reality viewer blade in an unfolded configuration according to an embodiment of the present invention.

FIG. 5 is a simplified plan view of a smart case and an attached virtual reality viewer blade in an unfolded configuration according to an embodiment of the present invention. In FIG. 5, the front of the smart case 420 is illustrated as well as the front of the mobile device 415 such as a smart phone. The portion of the virtual reality viewer blade 420 attached to the back of the smart case is illustrated by dashed lines 510 in FIG. 5. The virtual reality viewer blade 420 includes a plurality of panels that are connected to each other at alternating ends, providing a structure that can be folded into a compact design as illustrated in FIG. 4, unfolded into an expanded shape and illustrated in FIG. 5, and then re-folded in a three dimensional shape that enables a user to view virtual reality, i.e., 3D, content that is displayed on the mobile device. This three dimensional shape can be referred to as a VR viewer configuration.

The first panel 430 can be connected to the back of the smart case during use and disconnected when not in use. Connection of the first panel to the case can be mechanical and/or electromechanical to allow for control electronics to be integrated into the VR viewer in order to provide functionality including, but not limited to, zoom, volume, directional buttons, wheels, resistive surfaces, additional cameras, speakers, headphones, batteries, accelerometers, motion sensors, other sensors, screens, and the like. As an example, the first panel can include a printed circuit board having electronics disposed thereon. These electronics can include a dedicated graphics processor, microprocessor, buttons, camera(s), sensor(s), battery, connectors, switches, resistive surfaces, cables, screen(s), speakers, microphones, memory, other processors, a battery, and the like. In other embodiments, these electronics can be integrated into other ones of the panels of the virtual reality viewer module, with electrical/optical, or other suitable connections provided to enable communication between the smart case and the virtual reality viewer module.

The second panel 432 is attached to the first panel 430 at one side running along the length of the virtual reality viewer blade. In the unfolded configuration, the second panel is adjacent to the first panel and extends away from the side of the smart case. The third panel 436 is attached to the second panel 432 at a side of the second panel that is opposing the side that is attached to the first panel. The third panel includes a cutout that serves as a nose piece 525 for a user's nose and cutouts 520 that generally align with a user's eyes.

The fourth panel 436 is attached to the third panel 434 at a side of the third panel that is opposing the side that is attached to the second panel. The fifth panel is made up of two sub panels 438a and 438b that are one half the size of the first through fourth panels.

When folded into the VR viewer configuration, the second panel 432 extends in a direction perpendicular to the front face of the mobile device such that it lies in a plane normal to the front face of the mobile device. The second panel 432 extends away from the front face of the mobile device. The third panel 434 lies in a plane parallel to the front face of the mobile device and is positioned a distance L away from the front face of the mobile device. The user looks through cutouts 520 to view the screen on the front face of the mobile device. As will be evident to one of skill in the art, the screen on the front face of the mobile device can be split into two sub-screens to present different images for the left and right eyes, resulting in 3D content.

The fourth panel 436 folds back towards the front face of the mobile device such that it lies in a plane normal to the front face of the mobile device. The fourth panel in the VR viewer configuration is on the opposing side of and is parallel to the second panel. The sub panels 438a and 438b making up the fifth panel fold down towards the second panel 432 and form the sides a box formed by the front face of the mobile device (back), second panel (bottom), third panel (front), fourth panel (top), and sub panels (sides). In this VR viewer configuration, the user's eyes are about a distance L from the screen of the mobile device, which can then be used as a virtual reality display.

The materials of the virtual reality viewer blade can be selected to provide a comfortable viewing environment for the user. Compared with cardboard implementations, embodiments of the present invention provide long life and reliability. Depending on the age, size, and other characteristics of the user, the blades can be customized to modify the viewing distance L, the distance between the cutouts for the eyes, the shape or size of the nose piece, and the like. One of ordinary skill in the art would recognize many variations, modifications, and alternatives.

In the collapsed form illustrated in FIG. 4, the virtual reality viewer blade is compact and easy to store and transport. When folded into the VR viewer configuration, the blade provides a comfortable viewing position for the user to view 3D and virtual reality programming. After use, the blade can be returned to the compact collapsed form and can be removed from the smart case. In some implementations, one or more additional blades can be inserted between the smart case and the virtual reality viewer blade. As an example, a memory blade including VR content could be utilized in conjunction with the smart case and mobile device. In other implementations, the first panel of the virtual reality viewer blade includes electronic components to enable one or more blades to be attached and connected to the smart case. Thus, the first panel can include the functionality associated with blades as well as provide mechanical support for the remainder of the various panels. One of ordinary skill in the art would recognize many variations, modifications, and alternatives.

Figure 6A:
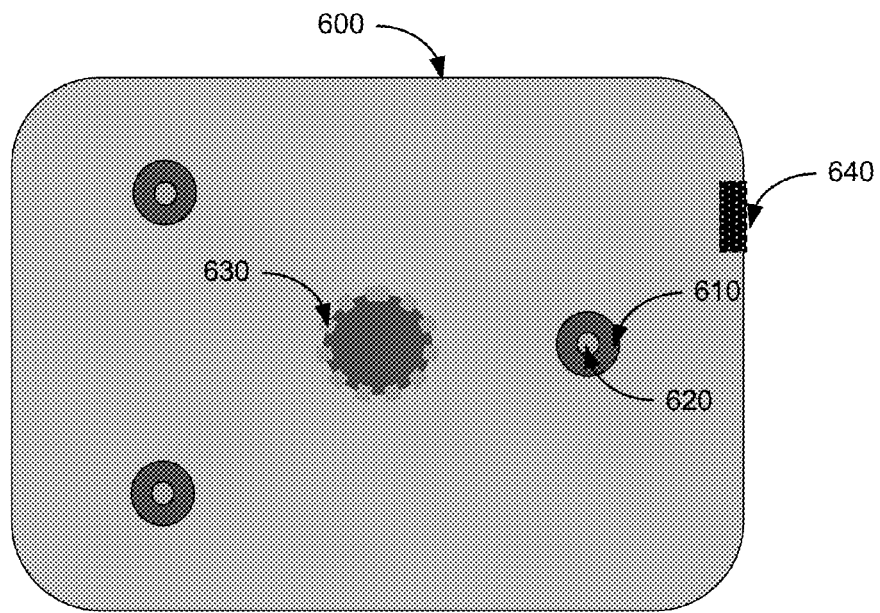
FIG. 6A is a simplified top view of an example portable smart media device according to an embodiment of the present invention.
Figure 6B:
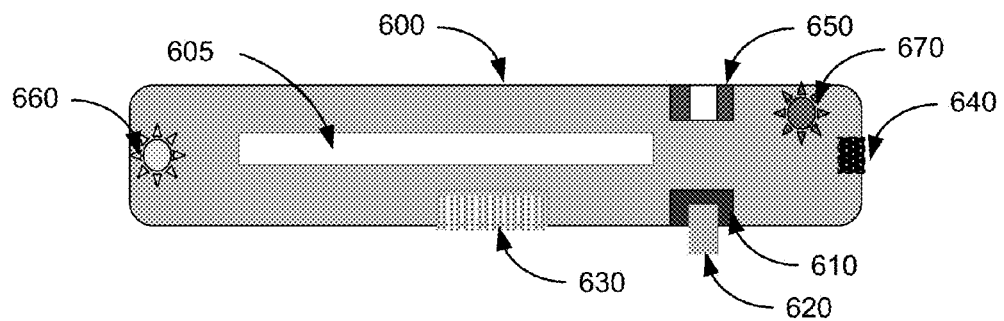
FIG. 6B is a simplified cross-sectional view of an example portable smart media device according to an embodiment of the present invention.

FIG. 6A is a simplified top view of an example portable smart media device 600 according to an embodiment of the present invention. FIG. 6B is a simplified cross-sectional view of portable smart media device 600 according to an embodiment of the present invention. As shown in FIGS. 6A and 6B, portable smart media device 600 includes a non-volatile data storage device 605, such as a flash memory or a hard disk, enclosed in a case. Data storage device 605 may include movies, music, games, e-books, or any other digital content stored thereon. Data storage device 605 may be accessible through, for example, a special connector 630 or a USB connector 640 such as a micro-USB connector.

Portable smart media device 600 may include one or more male adapters 610 for attaching to a mobile device or a case for a mobile device. In some embodiments, adapter 610 may include a magnet and a load pin 620. Load pin 620 may include a metal that can be magnetized. Load pin 620 may be of any suitable shape, such as a cylinder, a part of a cylinder, or a bar. The size of load pin 620 may be of any suitable size in length and cross-sectional size. For example, in some embodiments, load pin 620 may be a cylinder with a length of less than 5 mm and a diameter of less than 5 mm.

Portable smart media device 600 may include one or more female adapters 650 configured to match male adapters 610. Female adapters 650 may be located on a side of portable smart media device 600 opposite to male adapters 610. Female adapter 650 may include a magnet having a polarity opposite to the polarity of the magnet on male adapter 610 and a hole that can fit load pin 620. Thus, when put close to each other, female adapter 650 and male adapter 610 may attract each other and load pin 620 may be inserted into the hole I female adapter 650 to lock two portable smart media devices 600. In this way, multiple portable smart media devices 600 may be piggybacked for increased capacity. A case for a mobile device may also include one or more female adapters 650 as described above such that a portable smart media device 600 may be attached to the case in a similar manner using female adapter(s) 650 on the case and male adapter(s) 610 on portable smart media device 600.

Portable smart media device 600 may include a front indicator 660 for signaling whether portable smart media device 600 is released from a smart media hub as described below with respect to FIG. 7. Portable smart media device 600 may also include a back indicator 670 for signaling whether portable smart media device 600 is returned and docked to a smart media hub as described below with respect to FIG. 7. Front indicator 660 and back indicator 670 may be, for example, LEDs or LCD displays.

Even though not shown in the figures, portable smart media device 600 may include a built-in battery that can be charged, for example, through USB connector 640 or wirelessly. Portable smart media device 600 may include a unique identifier (ID) for distinguishing one portable smart media device from other portable smart media devices. Portable smart media device 600 may also include a processor or a controller that can control the operation of portable smart media device 600, for example, turning on front indicator 660 or back indicator 670 when appropriate.

Figure 7:
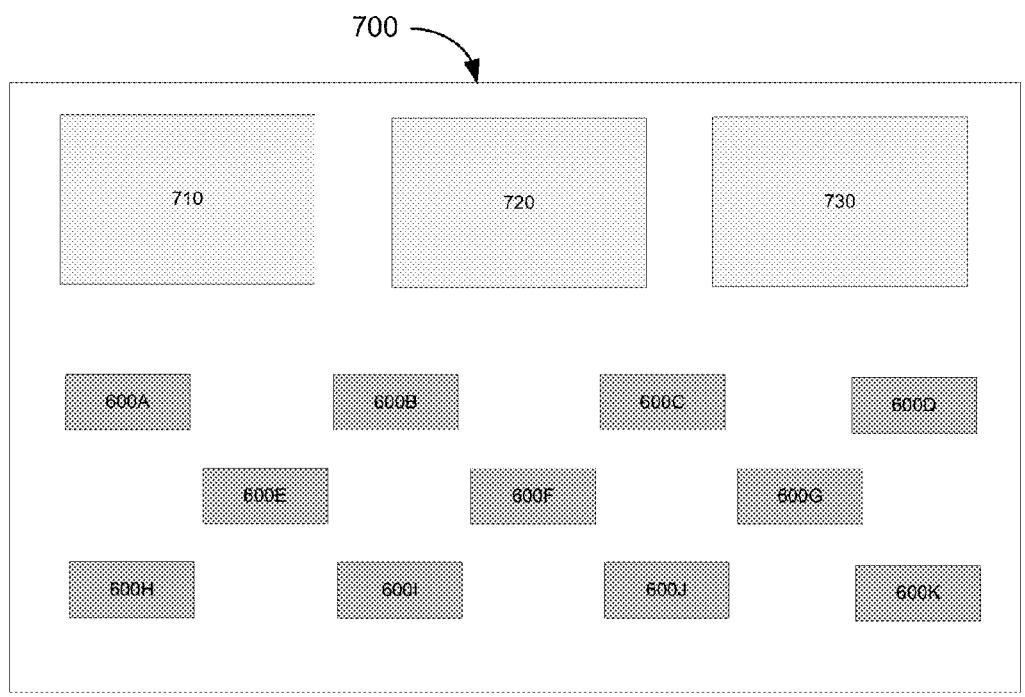
FIG. 7 is a simplified front view of a smart media hub according to an embodiment of the present invention.

FIG. 7 is a simplified front view of a smart media hub 700 according to an embodiment of the present invention. Smart media hub 700 may include a plurality of slots for storing portable smart media devices, for example, portable smart media devices 600A-600K as shown in FIG. 7. Smart media hub 700 may include a display 710 for displaying relevant information to a user, such as messages, instructions, available digital content, price information, transaction information, etc. Smart media hub 700 may include a payment card reader 720 that can read a payment card, such as a credit card, a debit card, or a gift card. In some embodiments, smart media hub 700 may include a key pad for entering information by a user, such as a security code for the payment card or a user selection. In some embodiments, display 710 may be a touchable device and can take input from a user without using a separate key pad. Smart media hub 700 may include a controller that can perform functions described herein. In some embodiments, rather than having a front indicator on each portable smart media device, smart media hub 700 may include a plurality of indicators on its front panel, such as LEDs or LCD displays, each indicator associated with a slot for indicating whether the portable smart media device is released.

Smart media hubs 700 may be kept at an airport, a stadium, a grocery store, a bus station, etc. When a user desires to access certain digital content, the user may select such content though display 710 and/or key pad 730, and pay the fee through payment card reader 720. Once the payment is accepted, smart media hub may release the corresponding portable smart media device having the desired digital content, and send a signal to portable smart media device to turn on the front indicator or turn on the indicator at the slot hosting the corresponding portable smart media device. The use can then remove the portable smart media device with the front indicator turned on from smart media hub 700, and connect the portable smart media device to a device that can access the digital content. When the user finishes using the portable smart media device, the user may return the portable smart media device to any smart media hub by inserting the portable smart media device into an open slot in the smart media hub. The smart media hub may identify the returned portable smart media device and update a database accordingly. The following section describes detailed operations of smart media hub 700 for releasing or locking a portable smart media device.

Figure 8:
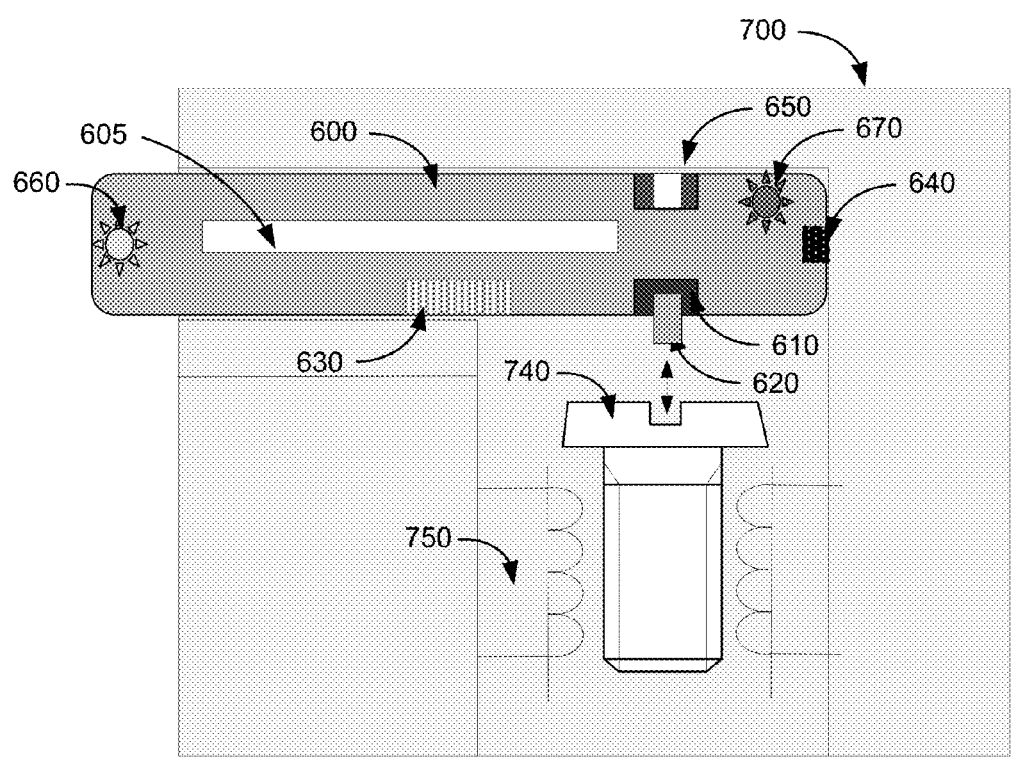
FIG. 8 is a simplified cross-sectional view of an example portable smart media device docked in an example smart media hub according to an embodiment of the present invention.

FIG. 8 is a simplified cross-sectional view of an example portable smart media device 600 docked in an example smart media hub 700 according to an embodiment of the present invention. In each slot of smart media hub 700, a plunger 740 controlled by a solenoid 750 may be used to lock or unlock portable smart media device 600. When portable smart media device 600 is in a position relative to smart media hub 700 as shown in FIG. 8, which may be at a time when a portable smart media device 600 is inserted back into smart media hub 700 or a time when portable smart media device 600 is released by smart media hub 700 but has not been removed by a user, male adapter 610 of portable smart media device 600 is aligned with plunger 740 of smart media hub 700.

When portable smart media device 600 is inserted back into smart media hub 700 in a position as shown in FIG. 8, solenoid 750 may be deactivated at the time as a default condition, and plunger 740 may move up due to the magnetic attraction of male adapter 610. As a result, load pin 620 of portable smart media device 600 is inserted into a groove or receptacle on plunger 740 to lock portable smart media device 600 such that portable smart media device 600 cannot be easily pulled out from the slot on smart media hub 700. In some embodiments, when portable smart media device 600 is inserted back into smart media hub 700 in a position as shown in FIG. 8, a USB connector on smart media hub 700 may be inserted into USB connector 640 on portable smart media device 600. Thus, smart media hub 700 may detect portable smart media device 600 and read the unique ID from portable smart media device 600 and update the database by indicating that the particular portable smart media device 600 has been returned. Alternatively, portable smart media device 600 may detect smart media hub 700 when the USB connection is established and turn on back indictor 670 such that smart media hub 700 may detect the indication signals and recognize that portable smart media device 600 has been returned.

When a user purchases or rents portable smart media device 600 by paying the fee as described above, smart media hub 700 may activate the corresponding solenoid 750 to generate a controlled magnetic field such that plunger 740 may be pulled down by the magnetic field generated by solenoid 750 or be repelled by male adapter 610 when the plunger is magnetized to have the same polarity as male adapter 610; and upon doing so, load pin 620 may be outside of the groove or receptacle on plunger 740 and be disengaged with plunger 740. Smart media hub 700 may then send a message to portable smart media device 600 to turn on front indicator 660. A user may then pull out the portable smart media device with the front indicator turned on.

The user may attach portable smart media device 600 to a mobile device with a case that has female adapter(s) as described above. If the mobile device does not have a case that can match with portable smart media device 600, an electronic cable, such as multipurpose electronic cable 200 described above, may be used to connect portable smart media device 600 to mobile device as described above in this disclosure.

Figure 10A:
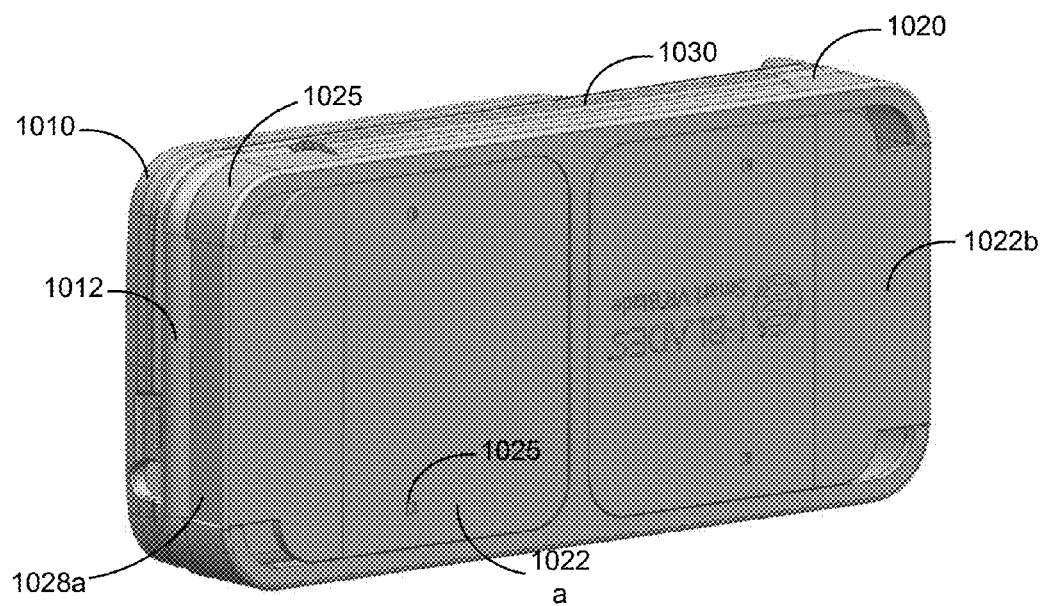
FIG. 10A is a simplified back view of a smart case and an attached virtual reality viewer blade in a folded configuration according to an embodiment of the present invention.
Figure 10B:
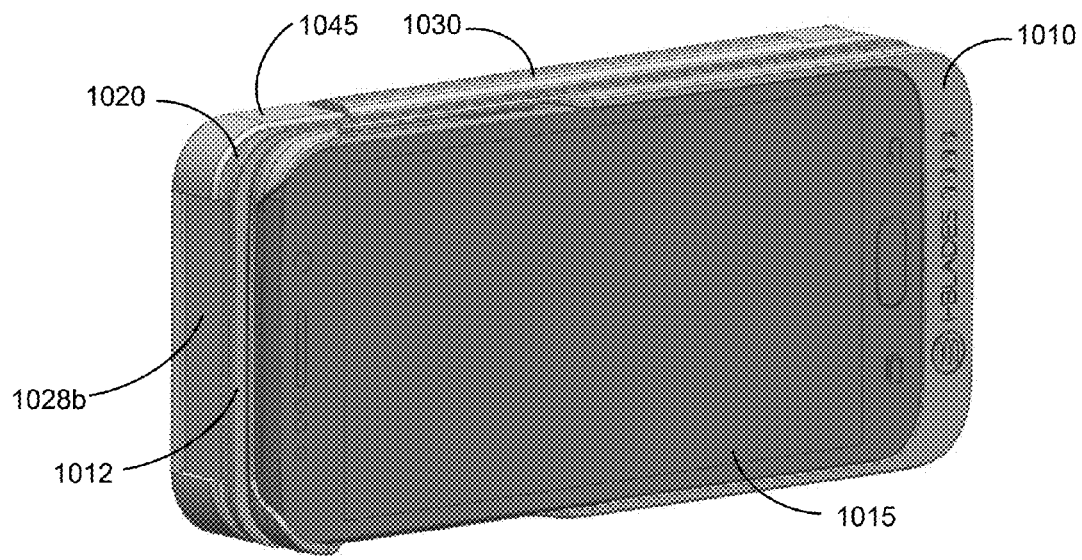
FIG. 10B is a simplified front view of the smart case and the attached virtual reality viewer blade of FIG. 10A in a folded position according to an embodiment of the present invention.

FIG. 10A is a simplified back view of a smart case 1010 and an attached virtual reality viewer blade 1020 in a folded configuration according to an embodiment of the present invention. FIG. 10B is a simplified front view of smart case 1010 and the attached virtual reality viewer blade 1020 of FIG. 10A in the folded position according to an embodiment of the present invention. In FIGS. 10A and 10B, a mobile electronic device 1015, for example, a smart phone, may be held by smart case 1010. As will be evident to one of skill in the art, the simplified plan view of the smart case and the attached virtual reality viewer blade shown in an unfolded configuration in FIG. 5 can be correlated with the simplified back and front views illustrated in FIGS. 10A and 10B. In some embodiments, smart case 1010 may include a non-volatile storage device (e.g., a flash memory) for storing virtual reality content, and/or an adapter slot for receiving removable memory cards (e.g., a compact flash card, a microSD card, a microSDHC card, etc.) with virtual reality content stored thereon. Smart case 1010 may include a case portion and a blade portion, where the case portion may at least partially cover mobile electronic device 1015 and the blade portion may be attached to the back of the case portion. The blade portion may include the non-volatile storage device and/or the adapter for receiving removable memory cards. The case portion and the blade portion may be on a single piece of the smart case. The case portion and the blade portion may also be on different pieces and may be detached from each other.

Virtual reality viewer blade 1020 may include a first panel 1012. First panel 1012 may include female adapter(s) 1014 (shown in FIG. 11A) on one side and male adapter(s) (not shown) on another side, as described above with respect to female adapter(s) 162 and male adapter(s) 152 of FIGS. 9A and 9B. The male adapters may be used to connect virtual reality viewer blade 1020 to smart case 1010 having female adapter(s). First panel 1012 may also include an electrical connector for electrical (e.g., power and data) communication with smart case 1010, as described above with respect to electrical connector 156 of FIG. 9A. First panel 1012 may include a non-volatile storage device (e.g., a flash memory) for storing virtual reality content, and/or an adapter slot for receiving removable memory cards (e.g., a compact flash card, a microSD card, a microSDHC card, etc.) with virtual reality content stored thereon. First panel 1012 may also include a printed circuit board having electronics disposed thereon as described above with respect to first panel 430 of FIG. 4.

Figure 13:
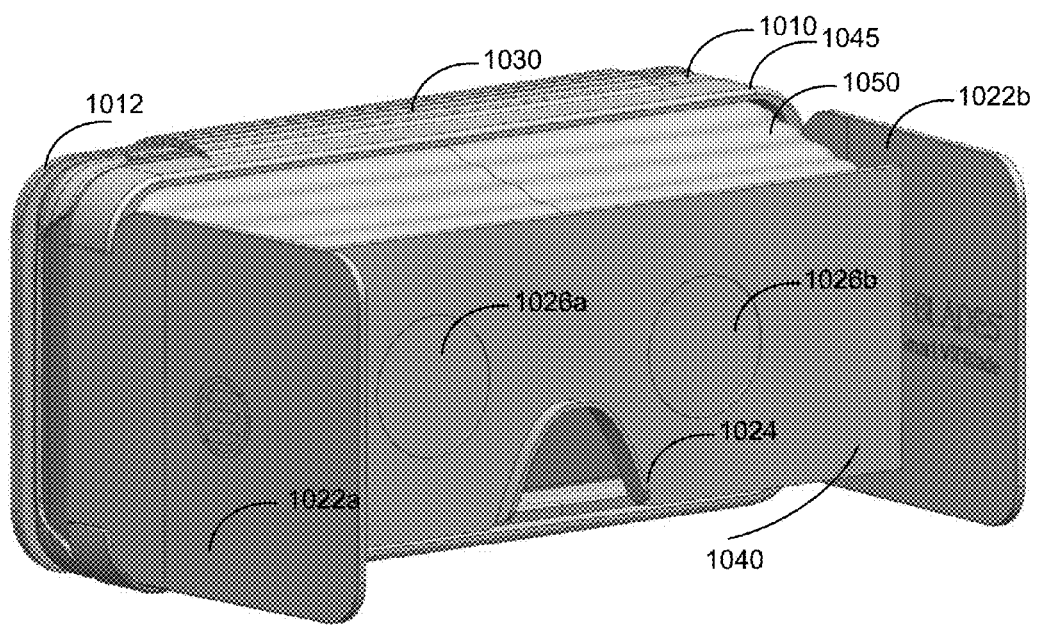
FIG. 13 is a simplified front view of a smart case and an attached virtual reality viewer blade in an operational configuration where an expandable viewer is expanded, according to an embodiment of the present invention.

Virtual reality viewer blade 1020 may also include an expandable viewer 1045 including cutout regions 1028a and 1028b on two opposite edges. Expandable viewer 1045 may also include two sub-panels 1022a and 1022b on one side of collapsed expandable viewer 1045. Sub-panels 1022a and 1022b may be rotated outwards for about 270° around cutout regions 1028a and 1028b, respectively, such that a portion of sub-panel 1022a is inserted into cutout region 1028a and a portion of sub-panel 1022b is inserted into cutout region 1028b in an expanded operational configuration as illustrated in FIG. 13 and described in detail below. Sub-panels 1022a and 1022b may also include a plurality of small receptacles 1025.

Expandable viewer 1045 may be attached to first panel 1012 through an extractable band 1030. Extractable band 1030 may be a flexible band that can be bent at different angles. Various implementations of extractable band 1030 may be used. For example, in some embodiments, extractable band 1030 may include a plurality of interconnected straps, such as straps on a watch strap band. The straps may be, for example, polycarbonate, plastic, foam, aluminum, carbon fiber, combinations thereof, or the like. The plurality of straps may be expandable or stretchable to extend the length of extractable band 1030. In some embodiments, extractable band 1030 may be fixed on one end to expandable viewer 1045 and extractable from a receptacle in first panel 1012. In some other embodiments, extractable band 1030 may be fixed on one end to first panel 1012 and extractable from a receptacle in expandable viewer 1045.

As also shown in FIGS. 10A and 10B, in the folded configuration where virtual reality viewer blade 1020 is not in use, extractable band 1030 may be partially retracted into expandable viewer 1045 or first panel 1012, and may partially cover the long edges of expandable viewer 1045 and first panel 1012. In various embodiments, first panel 1012 and/or expandable viewer 1045 may have a sharp edge that can fit into a gap between two straps of the plurality of interconnected straps of extractable band 1030 to lock extractable band 1030 into a stationary position. The sharp edge may be formed at an entrance to the receptacle for the extractable band, or on an edge of first panel 1012 or expandable viewer 1045.

Figure 11A:
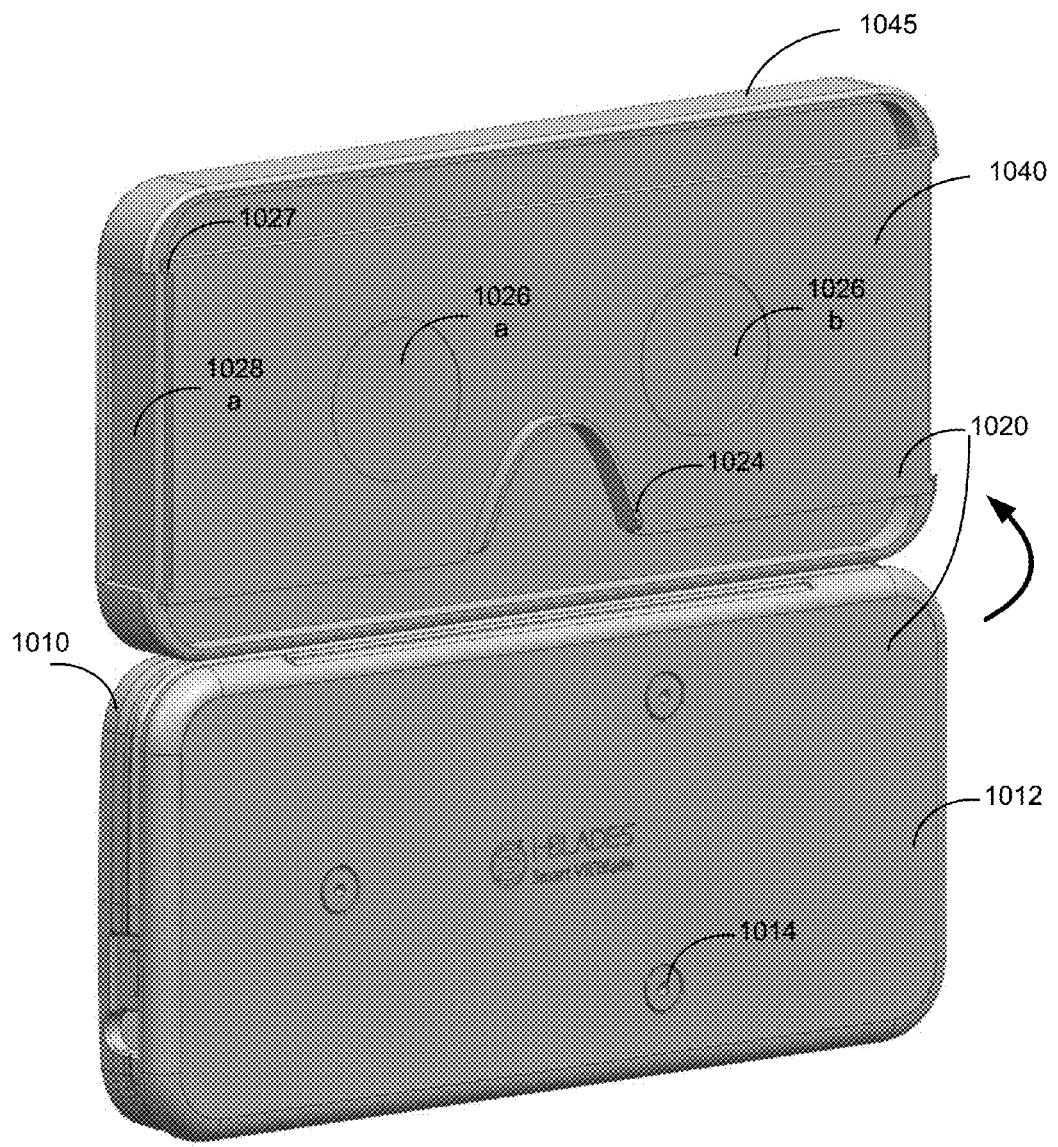
FIG. 11A is a simplified back view of a smart case and an attached virtual reality viewer blade in an unfolded position according to an embodiment of the present invention.
Figure 11B:
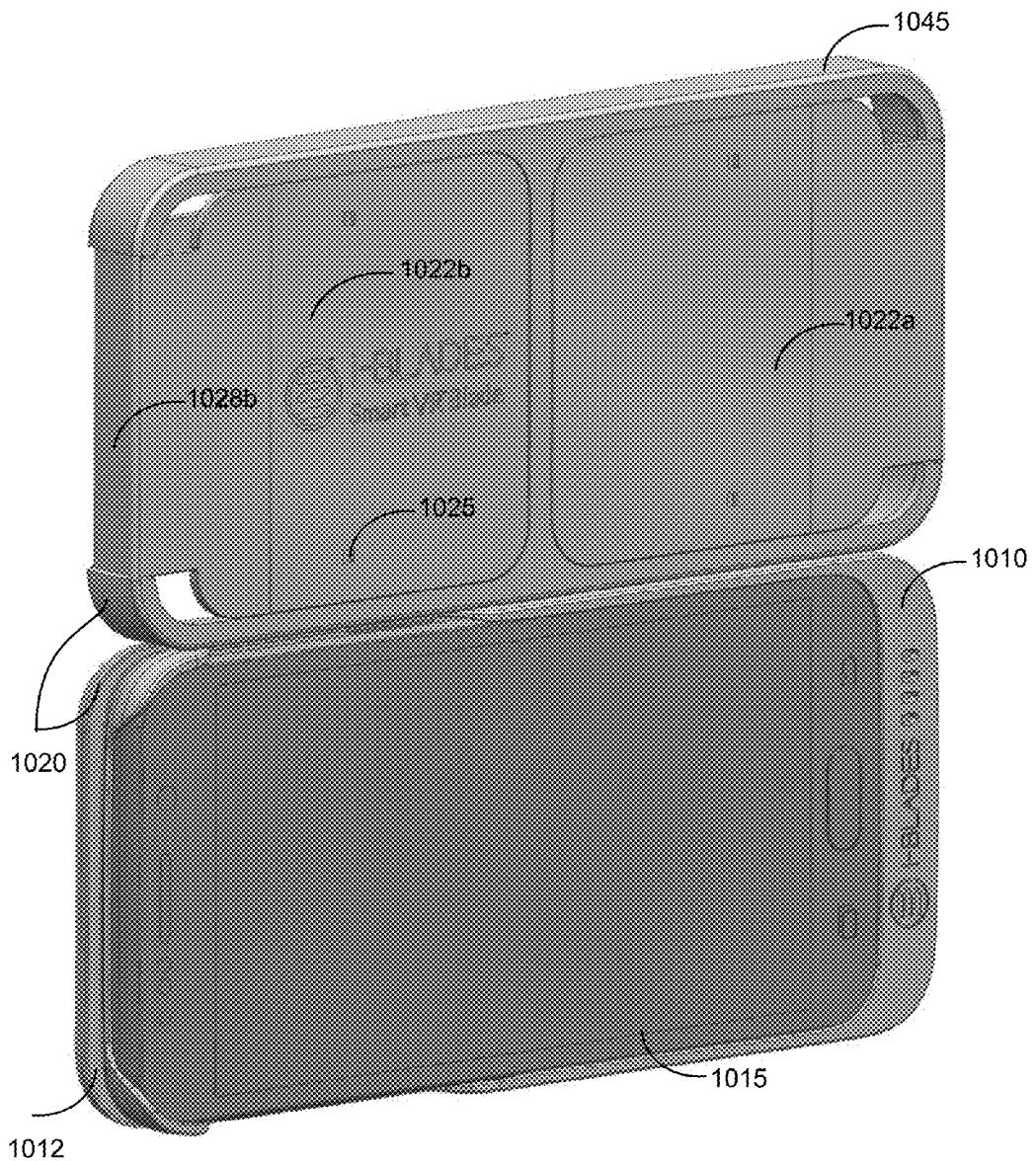
FIG. 11B is a simplified front view of the smart case and the attached virtual reality viewer blade of FIG. 11A in an unfolded configuration according to an embodiment of the present invention.

FIG. 11A is a simplified back view of a smart case and an attached virtual reality viewer blade as shown in FIG. 10A in an unfolded position according to an embodiment of the present invention. FIG. 11B is a simplified front view of the smart case and the attached virtual reality viewer blade of FIG. 11A in an unfolded configuration according to an embodiment of the present invention. In FIGS. 11A and 11B, expandable viewer 1045 is unfolded upwards by about 180° into an uprisen position. FIG. 11A illustrates one side of collapsed expandable viewer 1045, which may include a second panel 1040 including a nose piece 1024 and two cutout areas (optical apertures) 1026*a* and 1026*b*. Second panel 1040 may include a plurality of features 1027 that can fit into small receptacles 1025 on sub-panels 1022*a* and 1022*b*. Cutout areas 1026*a* and 1026*b* may include lenses for viewing the virtual reality content. Nose piece 1024 and cutout areas 1026*a* and 1026*b* shown in FIG. 11A may be pulled outwards to extend expandable viewer 1045 using, for example, bellows such as the ones used in an accordion. FIG. 11B illustrates the other side of collapsed expandable viewer 1045, which may include rotatable sub-panels 1022*a* and 1022*b* as described above with respect to FIGS. 10A and 10B.

Figure 12A:
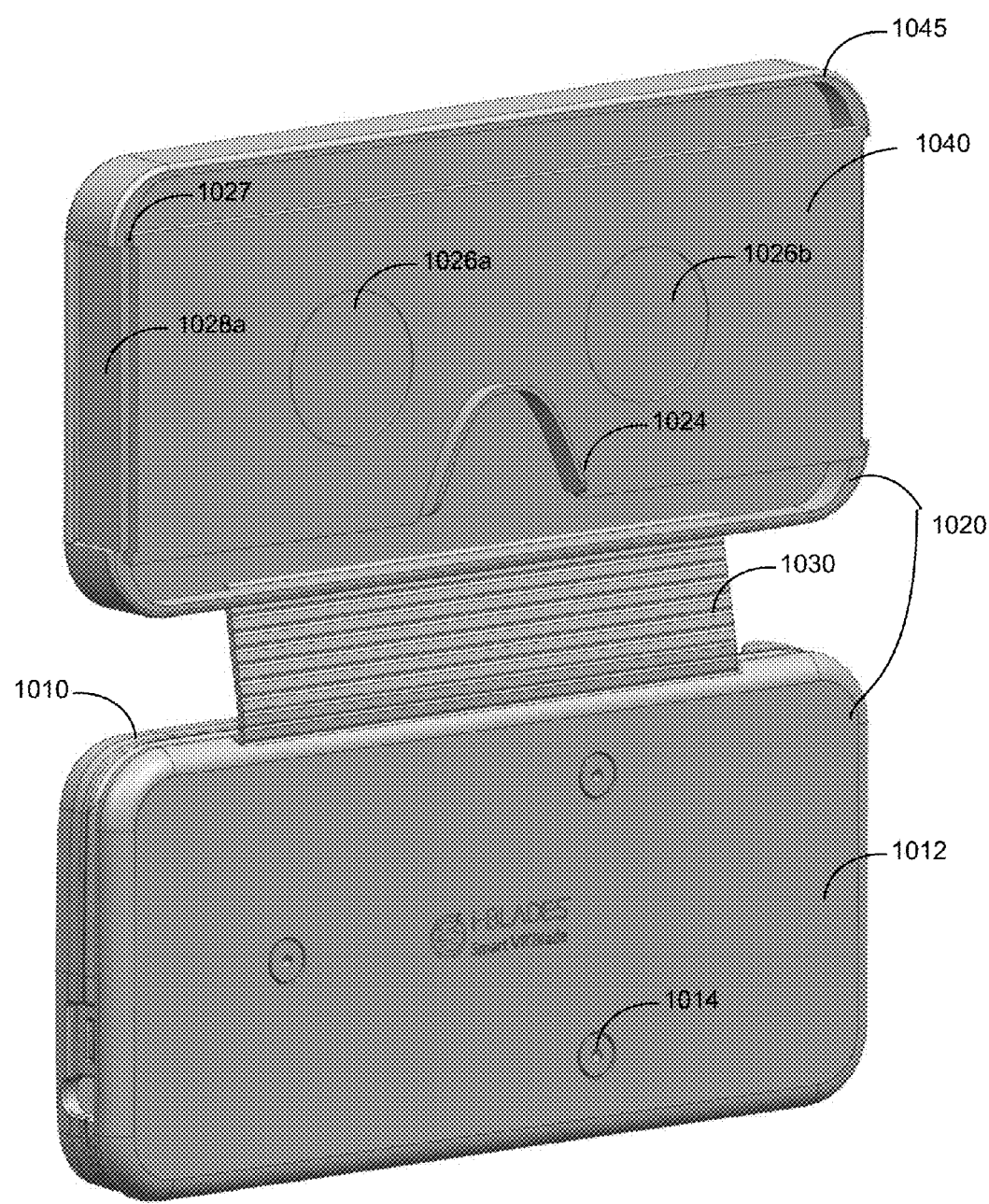
FIG. 12A is a simplified back view of a smart case and an attached virtual reality viewer blade in an unfolded and pulled-up position according to an embodiment of the present invention.
Figure 12B:
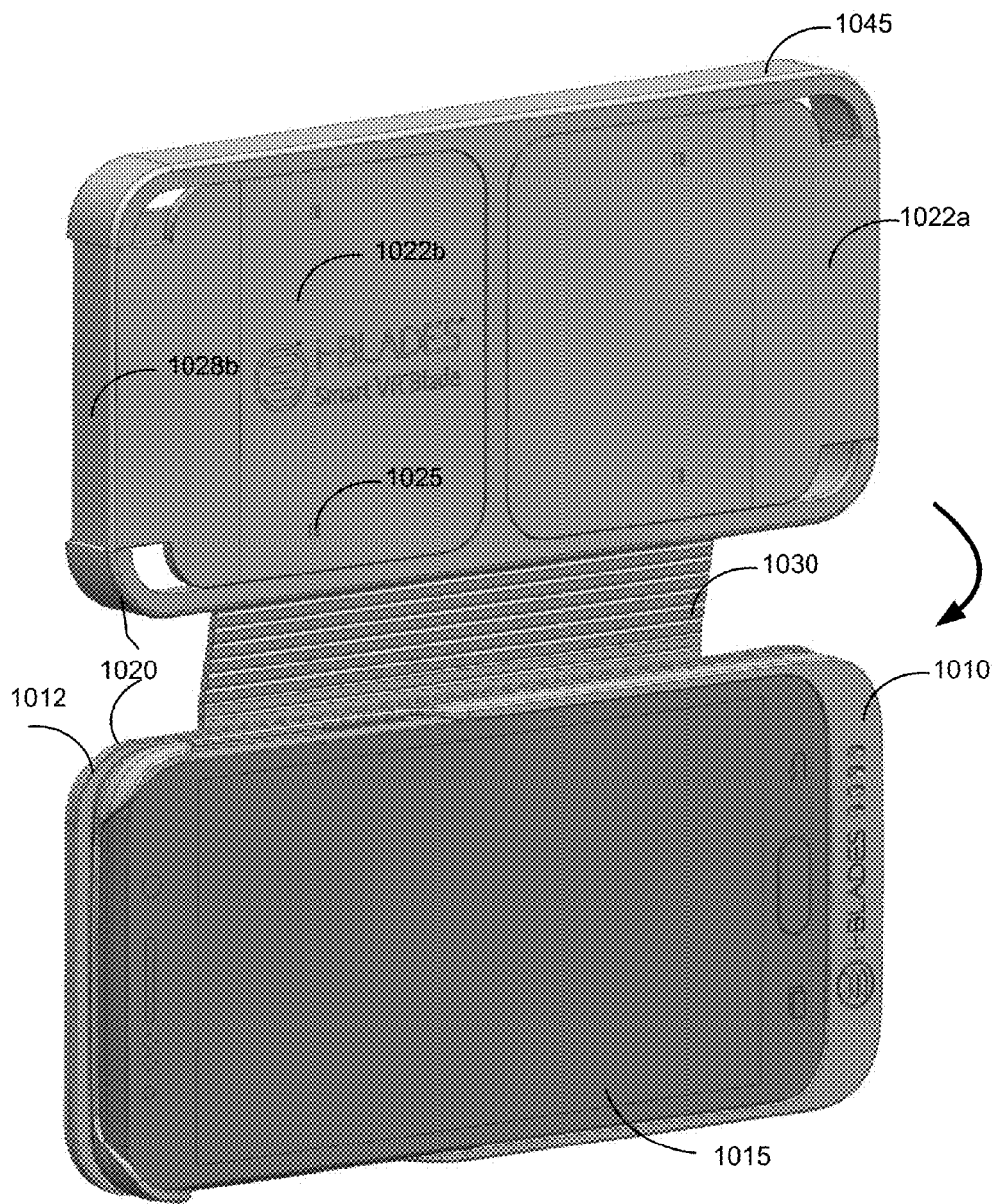
FIG. 12B is a simplified front view of the smart case and the attached virtual reality viewer blade of FIG. 12A in an unfolded and pulled-up position according to an embodiment of the present invention.

FIG. 12A is a simplified back view of a smart case and an attached virtual reality viewer blade as shown in FIG. 10A in an unfolded and pulled-up position according to an embodiment of the present invention. FIG. 12B is a simplified front view of the smart case and the attached virtual reality viewer blade of FIG. 12A in an unfolded and pulled-up position according to an embodiment of the present invention. FIGS. 12A and 12B illustrate expandable viewer 1045 of virtual reality viewer blade 1020 being flipped upwards by about 180°. FIGS. 12A and 12B also illustrate that extractable band 1030 may be pulled up from either first panel 1012 or expandable viewer 1045 of virtual reality viewer blade 1020. As such, extractable band 1030 may be used for mobile electronic devices of various sizes and various numbers of smart blades in a stack.

FIG. 13 is a simplified front view of a smart case and an attached virtual reality viewer blade as shown in FIG. 10A in an operational configuration (VR viewer configuration) where the viewer is expanded, according to an embodiment of the present invention. FIG. 13 illustrates expandable viewer 1045 of virtual reality viewer blade 1020 being rotated by about 360° around smart case 1010 and first panel 1012, and being expanded into the operational configuration for viewing virtual reality content or other content displayed on mobile electronic device 1015. As described above, sub-panels 1022*a* and 1022*b* can be rotated about 270° from its collapsed position shown in FIGS. 10A, 11B, and 12B, and a portion of sub-panels 1022*a* or 1022*b* fits into cutout region 1028*a* or 1028*b* and is restricted from further rotating by cutout region 1028*a* or 1028*b*. Extractable band 1030 may be extracted from first panel 1012 or expandable viewer 1045 of virtual reality viewer blade 1020 and may cover a portion of first panel 1012, an edge of mobile electronic device 1015, and a portion of expandable viewer 1045. Extractable band 1030 may be locked into a stationary position as described above. As shown in FIG. 13, in the operational configuration, bellows 1050 are expanded, and second panel 1040 is moved outwards into a position for viewing content displayed on mobile electronic device 1015. The plurality of features 1027 on second panel 1040 may be inserted into small receptacles 1025 on sub-panels 1022*a* and 1022*b* to interlock sub-panels 1022*a* and 1022*b*, second panel 1040, and bellow 1050.

As shown in FIG. 13, in the operational configuration, expandable viewer 1045 may be attached to the front of mobile electronic device 1015 and sealed by extractable band 1030, bellows 1050, second panel 1040, and sub-panels 1022*a* and 1022*b*. Thus, light leaked into the viewing area may be reduced for improved viewing experience.

In some embodiments, a headband may be attached to first panel 1012, or built into first panel 1012. The headband may be used to attach the assembly including smart case 1010, mobile electronic device 1015, and virtual reality viewer blade 1020 to the head of a user for hand-free viewing. The headband may be attached to, for example, the side edges of first panel 1012 or slots with an opening on the side edges of first panel 1012. The headband may also be configured to be extractable and expandable as extractable band 1030 described above.

In various embodiments, a plurality of smart blades or first panels may be arranged in a stack. At least one first panel of the plurality of first panels may include an expandable viewer, such as expandable viewer 1045 of virtual reality viewer blade 1020, attached to it using an extractable band, such as extractable band 1030. At least one first panel of the plurality of first panels may include a headband as described above for attaching the assembly to the head of a user.

Numerous benefits are achieved by way of the present invention over conventional techniques. For example, embodiments of the present invention provide portable virtual reality content viewers that are interoperable with a variety of mobile electronic devices. Embodiments of the present invention provide a compact device for viewing virtual reality content that provides a better sealing to reduce light leaked into the viewing area.

According to an embodiment of the present invention, a device for viewing virtual reality content is provided. The device includes a first panel configured to connect to a smart case for a mobile electronic device and an expandable viewer. The device also includes an extractable band attached to the first panel and the expandable viewer. The extractable band is extractable from the first panel or the expandable viewer and is configured for rotating the expandable viewer around the first panel.

In an embodiment, the extractable band is configured for rotating the expandable viewer between a position behind the mobile electronic device and a position in front of the mobile electronic device. In another embodiment, the extractable band includes a plurality of interconnected straps. As an example, the first panel or the expandable viewer can include a sharp edge configured to be inserted into a gap between two interconnected straps of the plurality of interconnected straps to lock the extractable band. In a specific embodiment, the first panel includes a receptacle for receiving and holding the extractable band. In another specific embodiment, the expandable viewer includes a bellow and a front panel attached to one end of the bellow, the front panel including a nose piece and a set of optical apertures. As an example, the expandable viewer can further include two rotatable sub-panels. The two rotatable sub-panels can each include a plurality of receptacles. The front panel can include a plurality of features configured to fit into the plurality of receptacles on the two rotatable sub-panels to lock the expandable viewer in an operational position.

In an embodiment, the device further comprises a headband attached to the first panel. The first panel can include one or more mechanical adapters and one or more electrical connectors for mechanically and electrically coupling the first panel to the smart case. The smart case can be electrically coupled to the mobile electronic device. In an exemplary embodiment, at least one of the first panel or the expandable viewer includes one or more control buttons or wheels for controlling a playback of the virtual reality content.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A module for use with an electronic device, the module comprising:
   a housing including a processor and a memory;
   an electronic cable coupled to a retracting spool disposed in the housing, wherein the electronic cable comprises a plurality of retention tabs disposed on the electronic cable; and
   a cable retention aperture passing through a side of the housing and including a wide portion and a narrow portion adjacent the wide portion;
   wherein the plurality of retention tabs contact the narrow portion of the cable retention aperture to prevent retraction of the electronic cable into the housing.

2. The module of claim 1 further comprising one or more retention shelves extending from the side of the housing and positioned between the wide portion and the narrow portion of the cable retention aperture.

3. The module of claim 1 wherein the retracting spool includes a plurality of annular contacts, the module further comprising a printed circuit board in electrical contact with the plurality of annular contacts through a set of electrical connectors.

4. The module of claim 1 wherein the electronic cable further comprises:
   a center portion;
   a first connector disposed at a first end of the center portion and having a first male extension; and
   a second connector having a female connector configured to connect to the first male extension of the first connector, wherein the second connector comprises a second male extension different from the first male extension.

5. The module of claim 4 wherein the electronic cable further comprises a third connector disposed at the first end of the center portion and having a third male extension.

6. The module of claim 5 wherein the third male extension is different from the first male extension and the second male extension.

7. The module of claim 6 wherein the first male extension complies with the micro-USB standard, the second male extension complies with the Thunderbolt standard, and the third male extension complies with the USB-C standard.

8. A smart media hub comprising:
   a controller;
   a plurality of slots, each slot configured to accommodate a portable smart media device; and
   a plurality of locking devices coupled to the controller, each locking device associated with a slot of the plurality of slots;
   wherein each locking device of the plurality of locking devices is configured to lock or release the portable smart media device under a control of the controller.

9. The smart media hub of claim 8 wherein the locking device comprises:
   a plunger with a receptacle; and
   a solenoid connected to the controller for controlling a movement of the plunger.

10. The smart media hub of claim 9:
    wherein the portable smart media device includes an adapter comprising a magnet and a load pin; and
    wherein the locking device is configured such that, when the adapter of the portable smart media device is aligned with the locking device on the smart media hub,
    when the solenoid is deactivated, the plunger is attracted by the magnet of the adapter such that the load pin of the portable smart media device is engaged with the receptacle of the plunger to lock the portable smart media device in the smart media hub; and
    when the solenoid is activated, the plunger is moved away from the adapter on the portable smart media device such that the load pin of the portable smart media device is disengaged with the receptacle of the plunger to release the portable smart media device from the smart media hub.

11. The smart media hub of claim 8 wherein the controller is further configured to turn on an indicator indicating that the portable smart media device is released.

12. The smart media hub of claim 8 wherein the controller is further configured to send a message to the portable smart media device to turn on an indicator on the portable smart media device indicating that the portable smart media device is released.

13. A smart media system comprising:
    one or more portable smart media devices, each of the one or more portable smart media devices comprising:
       a housing including a processor and a memory;
       an electronic cable coupled to a retracting spool disposed in the housing, wherein the electronic cable comprises a plurality of retention tabs disposed on the electronic cable; and
       a cable retention aperture passing through a side of the housing and including a wide portion and a narrow portion adjacent the wide portion;
       wherein the plurality of retention tabs contact the narrow portion of the cable retention aperture to prevent retraction of the electronic cable into the housing; and
    a smart media hub comprising:
       a controller;

a plurality of slots, each slot configured to accommodate one or the one or more portable smart media devices; and a plurality of locking devices coupled to the controller, each locking device associated with a slot of the plurality of slots;

wherein each locking device of the plurality of locking devices is configured to lock or release the portable smart media device under a control of the controller.

14. The smart media hub of claim 13 wherein the controller is further configured to turn on an indicator indicating that one of the one or more portable smart media devices is released.

15. The smart media hub of claim 13 wherein the controller is further configured to send a message to one of the one or more portable smart media devices to turn on an indicator on the one of the one or more portable smart media devices indicating that the one of the one or more portable smart media devices is released.

* * * * *